United States Patent
Ozbaysal

(10) Patent No.: US 9,527,162 B2
(45) Date of Patent: Dec. 27, 2016

(54) LASER ADDITIVE REPAIRING OF NICKEL BASE SUPERALLOY COMPONENTS

(71) Applicant: Kazim Ozbaysal, Orlando, FL (US)

(72) Inventor: Kazim Ozbaysal, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 636 days.

(21) Appl. No.: 13/891,314

(22) Filed: May 10, 2013

(65) Prior Publication Data

US 2013/0319580 A1    Dec. 5, 2013

Related U.S. Application Data

(63) Continuation-in-part of application No. 13/489,863, filed on Jun. 6, 2012.

(60) Provisional application No. 61/645,863, filed on May 11, 2012, provisional application No. 61/556,395, filed on Nov. 7, 2011.

(51) Int. Cl.
| | |
|---|---|
| B23K 26/34 | (2014.01) |
| B23K 26/342 | (2014.01) |
| B23K 35/30 | (2006.01) |
| B23K 26/32 | (2014.01) |
| B23K 35/02 | (2006.01) |
| B23P 6/00 | (2006.01) |

(52) U.S. Cl.
CPC ............. B23K 26/345 (2013.01); B23K 26/32 (2013.01); B23K 26/34 (2013.01); B23K 26/342 (2015.10); B23K 35/0244 (2013.01); B23K 35/3033 (2013.01); B23K 2201/001 (2013.01); B23K 2203/08 (2013.01); B23P 6/007 (2013.01)

(58) Field of Classification Search
CPC ....... B23K 26/34; B23K 26/342; B23K 35/30; B23K 35/3033
USPC ................................... 148/524–526
See application file for complete search history.

(56) References Cited

U.S. PATENT DOCUMENTS

| | | |
|---|---|---|
| 4,804,815 A | 2/1989 | Everett |
| 6,124,568 A | 9/2000 | Broderick et al. |
| 2002/0148817 A1 | 10/2002 | Tewari |

(Continued)

FOREIGN PATENT DOCUMENTS

| | | |
|---|---|---|
| DE | 102010041284 A1 | 3/2012 |
| JP | H005192785 A | 8/1993 |

(Continued)

OTHER PUBLICATIONS

Krista Amato, et al: "A Comparison of Microstructures and Properties for a Ni-Based Superalloy (Alloy 625) Fabricated by Electron Beam Melting," Journal of Materials Science Research, vol. 1, No. 2; pp. 3-41, XP009176859, "2.1 EBM and SLM Processing".

(Continued)

*Primary Examiner* — Brian Walck

(57) ABSTRACT

Ni base superalloy components containing relatively large amounts of Al and Ti are known to be difficult to build up by a weld build up process without cracking. As the Al and Ti content of the superalloy is increased to improve the strength, the susceptibility to cracking is increased. It is shown herein that reducing the γ' phase in the additive built up material improves robustness against cracking. A stepwise, controlled heating and cooling process is described to be used in cooperation with an additive build up process to reduce the γ' present and thereby reduce cracking.

6 Claims, 3 Drawing Sheets

(56) References Cited

U.S. PATENT DOCUMENTS

2004/0112940 A1* 6/2004 Caddell, Jr. .............. B23K 9/16
                                                          228/103
2010/0078411 A1 4/2010 Hughes et al.

FOREIGN PATENT DOCUMENTS

| JP | 2001083822 A | 3/2001 |
| JP | 2001269784 A | 10/2001 |
| JP | 2011214541 A | 10/2011 |
| WO | 9506540 A1 | 6/1997 |
| WO | 200015382 A1 | 8/2002 |

OTHER PUBLICATIONS

Tresa M. Pollock, et al; "Nickel-Based Superalloys for Advanced Turbine Engines: Chemistry, Microstructure, and Properties," pp. 361-374, XP055073292.

Peter V. Dembrowski et al., "Communications: The Ductility Response to Three High Temperature Materials Tested Under Hydrostatic Pressure", vol. 6B, Mar. 1975.

E. French et al., "The Effects of Hydrostatic Pressure on the Mechanism of Tensile Fracture of Aluminum", Metallurgical Transactions A, vol. 6A, Jun. 1975.

D. Watkins et al., "Effect of Hydrostatic Pressure on the Hot-Working Behavior of a Gamma Titanium Aluminide", Metallurgical Transactions A, vol. 23A, Sep. 1992.

* cited by examiner

LASER ADDITIVE REPAIRING OF NICKEL BASE SUPERALLOY COMPONENTS

CLAIM TO PRIORITY

This is a utility patent application filed pursuant to 35 U.S.C. §111 (a), and claims priority pursuant to 35 U.S.C. §119 from provisional patent application Ser. No. 61/645,863 filed May 11, 2012. This application is a continuation-in-part of application Ser. No. 13/489,863 filed Jun. 6, 2012 (claiming priority from provisional patent application 61/556,395 filed Nov. 7, 2011) and claims priority therefrom pursuant to 35 U.S.C. §120 and/or §365. This application also incorporates by reference commonly owned application Ser. No. 13/611,034, filed Sep. 12, 2012, issued as U.S. Pat. No. 9,272,365 on Mar. 1, 2016. The entire contents of the aforesaid United States applications are incorporated herein by reference for all purposes.

BACKGROUND OF THE INVENTION

1. Field of the Invention

The present invention relates to the repair, reshaping and cladding of superalloy components, and more particularly, to the weld build up of nickel base superalloy components containing relatively large amounts of aluminum and/or titanium, employing a hold and cool process so as to reduce susceptibility to cracking, and to the materials so produced.

2. Background and Related Art

Nickel base superalloys (also known as nickel based or nickel-based) are high-temperature materials which display excellent resistance to mechanical and chemical degradation of properties even as temperatures approach the melting points of the materials. Ni base superalloys are based upon nickel (Ni) and typically contain numerous other elements such as chromium (Cr), aluminum (Al), titanium (Ti), tungsten (W), cobalt (Co), tantalum (Ta), carbon (C), among others. Such high-temperature superalloys found early application in aircraft turbine engines. A higher operating temperature typically leads to increased fuel efficiency and lower carbon emissions, causing superalloys to find increasing uses in ground-bases turbine systems as well. For example, see *The Superalloys*, by Roger C. Reed, (Cambridge University Press, 2006, particularly Chapter 1. The entire contents of this reference is incorporated herein by reference for all purposes.

The Al and Ti content of Ni base superalloys is typically increased in order to improve the high temperature strength, but at the expense of introducing challenges in welding or weld buildup of such materials. Generally, increased Al and/or Ti content of a Ni base superalloy increases the susceptibility of the material to cracking during welding or weld build up. Our previous work in this field cited above addressed the improvement in the weld repair of such superalloys. The present work addresses the related problem of weld build up of material while reducing the susceptibility to cracking of the materials so constructed.

The reference cited above, Ser. No. 13/611,034 (U.S. Pat. No. 9,272,365) explicitly states that cracking typically becomes a problem for a superalloy having more than 6% aggregate aluminum or titanium content (Paragraph [0008] of Ser. No. 13/611,034 as filed and Col. 1, L. 43-47 of U.S. Pat. No. 9,272,365). For economy of language herein we refer to such alloys as having "significant titanium and aluminum content."

Thus a need exists in the art for improved methods to build up Ni base superalloy materials by a weld build up process, typically a laser additive repair process, particularly for those superalloys including relatively large amounts of Al and/or Ti.

BRIEF SUMMARY OF THE INVENTION

It is one objective of the processes described herein to provide a process for build up of Ni based superalloy materials from powder by heating and controlled stepwise cooling of the material so as to produce no more than about 20% γ' phase in any single cool and hold portion of the process, as well as no more than about 20% γ' phase in the final room temperature material.

Nickel base superalloys with large amounts of Al and Ti contents are known to be difficult to weld build up. As the Al and Ti content of a superalloy is increased to improve the component high temperature strength, weldability of the component is drastically reduced. Some embodiments of this invention employ elemental partitioning of Al and Ti to γ and γ' through a controlled step cool and hold process. The time-temperature protocol of the step cool and hold process is chosen so as to deplete the γ from Al and Ti in order to improve weldability. When the Al and Ti content of the γ in the weld build up is reduced to a weldable region of no more than about 20% γ', the controlled step cool and hold process is replaced with regular weld argon cooling.

The processes described herein provide for elemental partitioning of Al and Ti during the hold and cool process so as to deplete γ from Al and Ti and to reduce susceptibility to cracking in the material so produced.

Accordingly and advantageously, these and other advantages are achieved in accordance with the present invention as described in detail below.

(2A) Elemental partitioning at full phase equilibrium from Ni—Al pseudo binary phase diagram.

(2B) Shift in TTT (time-temperature-transformation) diagram due to step cool and hold process.

(2C) Anticipated stress relief of a welded interface at each hold temperature during partitioning of Al and Ti.

(2D) Shift of composition of alloy 247 to crack free region due to partitioning.

Figure 3:
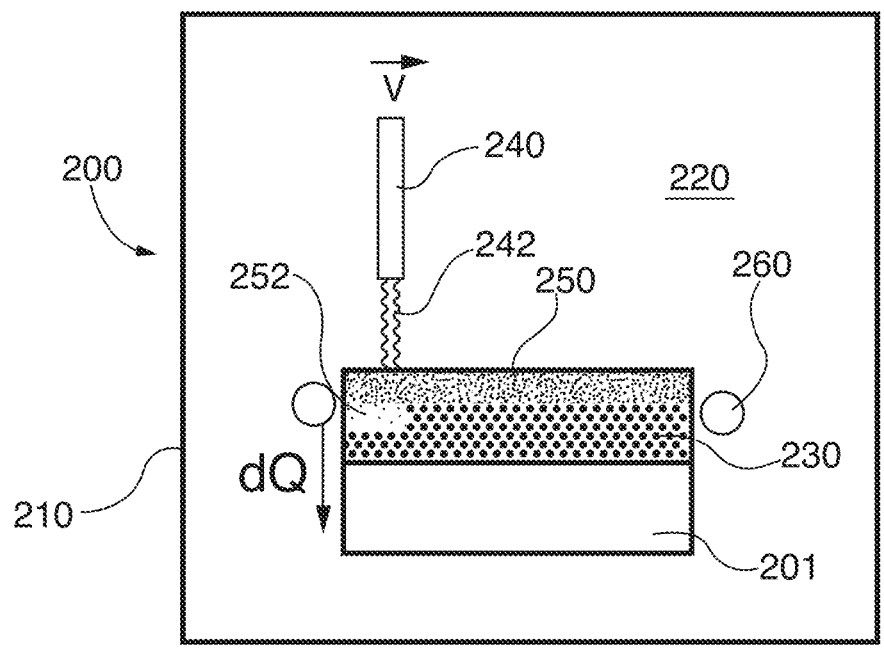

FIG. 3 is a schematic depiction of typical apparatus for performing a hold and cool process pursuant to some embodiments of the present invention with preplaced powder.

Figure 4:
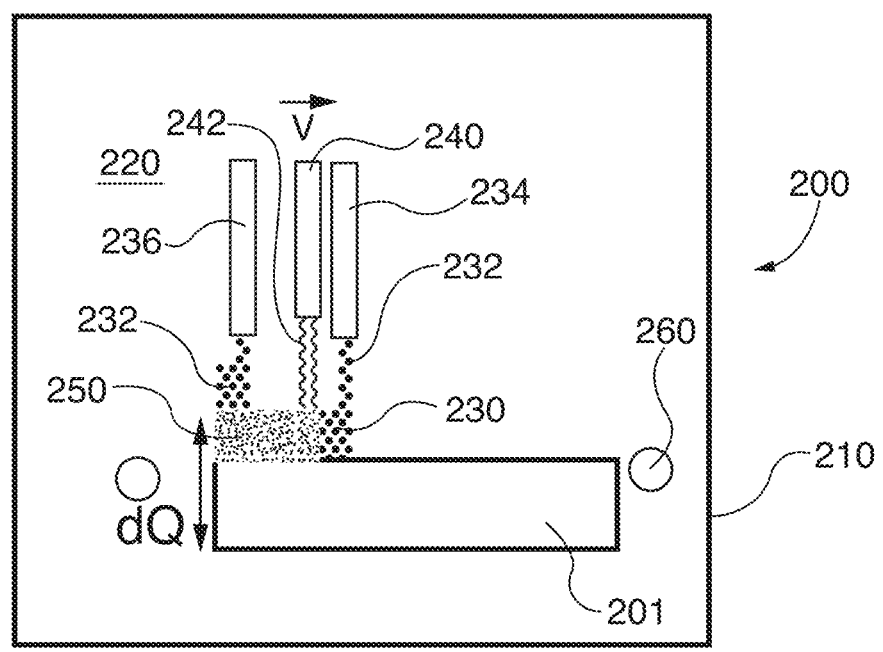

FIG. 4 is a schematic depiction of typical apparatus for performing a hold and cool process pursuant to some embodiments of the present invention with concurrently placed powder.

DETAILED DESCRIPTION

All percentages given herein are weight percent unless otherwise specified.

Ti and Al are typically added to Ni base superalloys to increase the high temperature strength of the component, but with the disadvantage of drastically increasing the difficulty of producing satisfactory welds or weld build ups. For economy of language we refer hereinafter to Ni base superalloy with relatively high Al, Ti content as simply "Ni base superalloys" or "Ni superalloys." The welds or weld build ups typically produced with such Ni superalloys are susceptible to cracking either during the weld or build up process or in subsequent repair steps involving these materials. Previous work by the present inventors (cited above) involving a detailed study of factors affecting weldability of Ni base superalloys and their susceptibility to cracking has led the present inventors to conclude that a γ' phase present in an amount generally less than about 20 weight percent is indicative of weldability without unacceptable susceptibility to cracking. A γ' content greater than about 60% is generally indicative of nonweldability (that is, susceptibility to strain age cracking) while intermediate γ' values typically indicate difficult and expensive welding. Substantially the same conclusions can be drawn for additive or weld build up processes. That is, a γ' phase present in an amount less than about 20 weight percent is indicative of weld build up without unacceptable susceptibility to cracking. γ' greater than about 60% is generally indicative of weld build up having an unacceptable susceptibility to cracking.

Additive manufacturing by laser beam weld build up (also called build-up welding or build up welding) is comparable to plasma build up welding as well as plasma spraying. To be concrete in our description, we discuss herein the important practical case in which a laser beam provides the directed energy to heat the material as desired. This is not to exclude other sources of directed energy such as plasma, second laser, electron beam, among others as would be apparent to those having ordinary skills in the art. However, for economy of language we refer to all such additive build up processes as laser additive processes or laser weld build up or equivalent language.

Previous work by this inventor (cited above) focused on reducing cracking in the welding of Ni base superalloys. The work described herein relates to the additive build up of a layer of material (typically from about 1 millimeter (mm) to about 50 mm in thickness). The present discussion is directed to the repair build up (typically 1-50 mm thick) that has favorable welding characteristics, that is, reduced susceptibility to cracking. Thus, the present description relates to the fabrication of a Ni base superalloy material or component having favorable welding properties. It is anticipated that such materials or components can be fabricated for use in myriad applications apparent to one having ordinary skill in the art.

Figure 1:
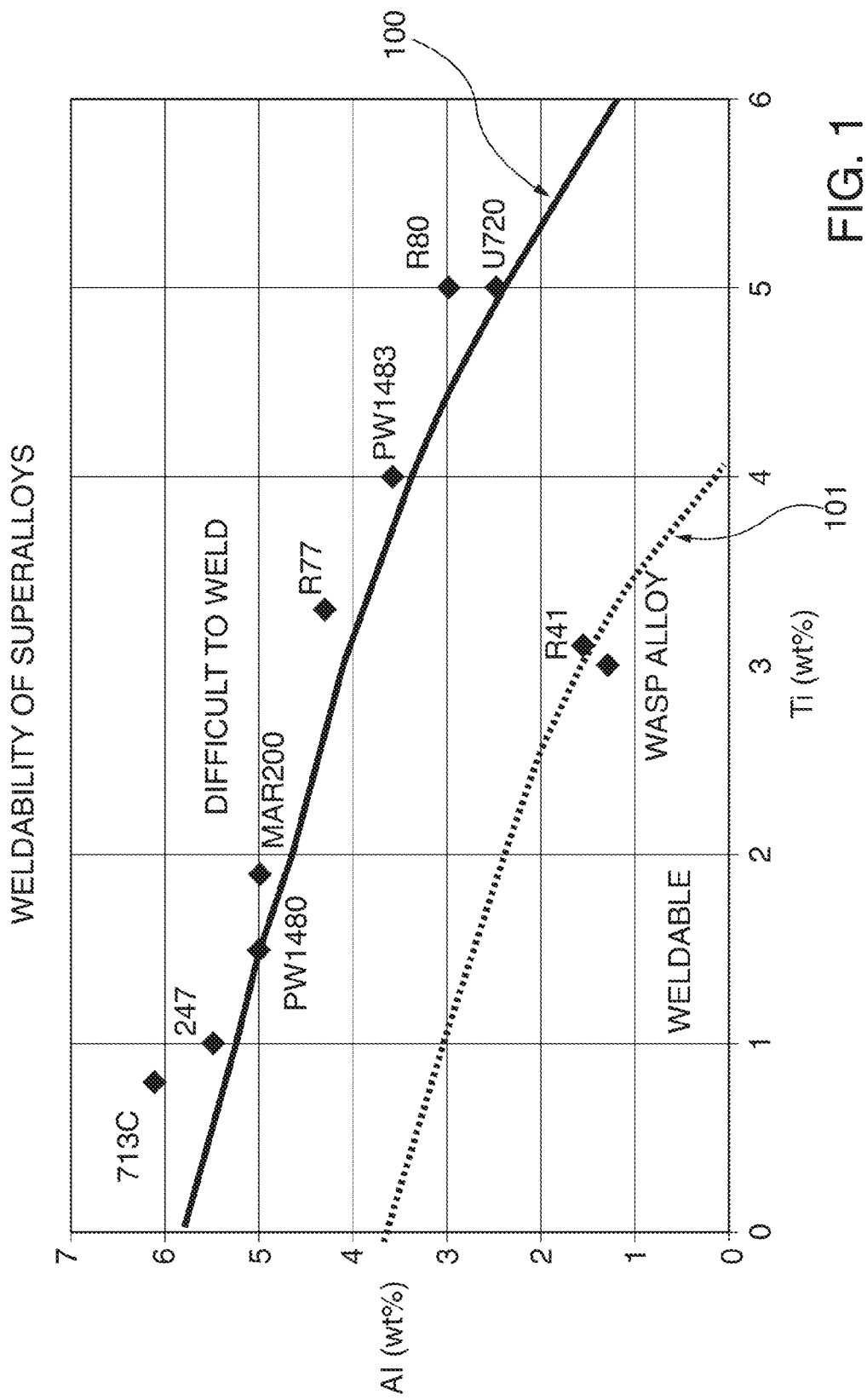
FIG. 1 is a graphical depiction of the weldability of some superalloys as a function of Ti and Al content.

FIG. 1 is a graphical depiction of the weldability of typical Ni base superalloys as functions of the Al and Ti content. Those alloys lying above line 100 in FIG. 1 are generally considered not to be weldable, and hence, not amenable to weld build up. In practice, this typically means that materials having compositions above line 100 produce materials susceptible to strain age cracking in the fusion zone (FZ). Thus, whenever such components in commercial equipment require repair, they are typically replaced rather than repaired since the susceptibility to cracking will result in a large fraction of failed repairs.

Conversion of the compositions given in FIG. 1 to the fraction of various phases present shows that nonweldable alloys generally have more than about 60% γ' phase in their final structure. In contrast, the weldable Ni base superalloys depicted in FIG. 1 have generally less than about 20% γ' phase in their final structure, below line 101 in FIG. 1. Therefore, it is anticipated that Ni base superalloys with less than about 20% γ' will be weldable without detrimental amounts of strain age cracking in the FZ.

Heat affected zone (HAZ) cracking in high strength Ni base superalloys occurs due to the presence of grain boundaries containing low melting point elements. A large heat input during laser build up thus creates a large HAZ and results in a large amount of HAZ cracking due to melting at the grain boundaries. This is a common problem in previous build up processes in which a laser beam typically interacts with the base metal during powder deposition. Thus, an important problem in the field of additive build up of superalloys is to produce crack free, near 100% base metal laser build up, particularly on the important commercial use of superalloys for gas turbine components. As described in detail herein, one advantage of the present processes relates to the creation of a relatively small HAZ, typically no more than about 100 μm HAZ (μm=micron=$10^{-6}$ meter).

Typical embodiments of the welding apparatus 200 present invention include placing a component substrate 201 into a chamber 210 containing an inert atmosphere 220 and predepositing the powder 230 to be melted in front of the moving laser 240 onto the substrate 201 having substantially the same composition as the powder 230, as depicted schematically in FIG. 3. Other embodiments include concurrent deposition of the powder 230 before and/or after the application of the laser 240 energy dQ, as depicted in FIG. 4. To be concrete in our description, we describe in most detail the example of preplaced powder depicted in FIG. 3, understanding thereby that modifications to handle concurrent powder placement (FIG. 4), are modifications of the techniques described for preplaced powder, apparent to one having ordinary skill in the art.

In contrast to typical weld build up processes, the processes described herein include some or all of the following steps:

a: Preplacing the powder 230 onto a component substrate or substrate 201 where a buildup of the same composition is desired and both powder and substrate have substantially the same composition (FIG. 3), or laying the powder in front and behind the moving laser beam 242 (or other directed energy beam, as shown in FIG. 4.

b: Heating the preplaced powder 230 to above about 1200 deg. C.

c: Laser 240 melting the preplaced powder 230 so as to produce a heat affected zone (HAZ less than about 100 microns in extent).

d: Producing a known fraction of γ' during each cooling step in the cooling of the solidified powder 250, resulting in;

e: Partitioning Al and Ti between γ and γ' to reduce fusion zone (FZ) cracking susceptibility.

These procedures represent an improvement over conventional build up techniques for superalloys that are generally not completely successful in eliminating strain age cracking and incipient melting. To avoid cracking, some previous techniques employ a lower-temperature method such as brazing but this typically has the disadvantage of lowering strength.

Nearly all commonly used laser build up processes include interaction of the laser beam with the base material. This process causes the HAZ to be large and increases the susceptibility of the base metal to grain boundary cracking. Some embodiments of the present invention preplaces powder of the same or similar composition as the component onto the surface of the component where build up is needed to a thickness of about 1.0 mm to 50 mm (millimeter). Powder size is typically in the range from about 10 microns to about 100 microns.

This preplaced powder is heated under an inert atmosphere with a first heat source to about 1200 deg. C. and held at that temperature for a minimum of 5 minutes to dissolve substantially all γ' phase. An induction coil 260 may advantageously be used as this first heat source as depicted in FIG. 3. This is by way of illustration and not limitation as other first heat sources could also be employed as would be apparent to one having ordinary skill in the art.

A second heat source such as a laser 240 generating a laser beam 242 or other directed energy source, scans the preplaced powder 230 and heats the powder. The powder 230 thus melts and solidifies to a certain first depth 250 as depicted in FIG. 3A. To avoid producing an overly large HAZ, the laser power dQ is advantageously adjusted so that more than one laser scan is typically required to melt and solidify the preplaced powder. That is, the laser power dQ is adjusted so that a relatively small amount of dilution with the base metal occurs when the melting process of the preplaced powder 230 is finished, understanding that small dilution means a small HAZ.

FIG. 3 is a schematic depiction of typical melting apparatus 201 for preplaced powder 230 (FIG. 3) and for concurrently placed powder 230 (FIG. 4). Preplaced powder 230 prevents the fully intense laser beam 242 from interacting with the substrate 201 base metal and causing a large HAZ. Preheating the powder 230 is aimed at reducing the FZ cracks. Preplacing the powder 230 is aimed at preventing the laser beam 242 from interacting with the substrate 201 base metal and reducing grain boundary cracking.

In FIG. 4, a thin layer of preplaced powder 230 is heated to approximately 1200 deg. C. by the induction preheater and, once the laser begins scanning, further heating of the preplaced powder occurs. A laser beam 242 moves over and melts this preplaced powder 230, fusing it to the base material while additional powder 232 is continuously preplaced in front of and behind the moving laser. The process is repeated for as many layers of powder as desired. This embodiment depicted schematically in FIG. 4 likewise employs the concept of the laser beam 242 striking the powder 230 and not the substrate.

In the first pass over the preplaced powder 230 (FIG. 3), only the top portion of the preplaced powder is melted 250, typically only a few microns per pass. Following passes melt layers 252 having similar thicknesses until the final layer in contact with the substrate 201 base metal is melted and fusion is accomplished. This method significantly reduces the HAZ thickness since direct contact of the laser beam 242 with the substrate 201 base metal is substantially reduced.

Once the melting process for the preplaced powder 230 is finished and the molten powder solidifies to a temperature of no less than 1200 deg. C., the solidified powder 250 is held at that temperature a minimum of one minute followed by a hold and cool process.

The hold and cool process employs the elemental partitioning of Al and Ti to γ and γ' in full thermodynamic phase equilibrium to accomplish no more than 20% γ' formation at any time during the joining and build up process. The process depletes the γ from Al and Ti. The final γ composition is moved to the weldable region at the end of the SCH (stepwise hold and cool) process as shown in FIG. 2 to prevent strain age cracking (FZ cracking)

Figure 2:
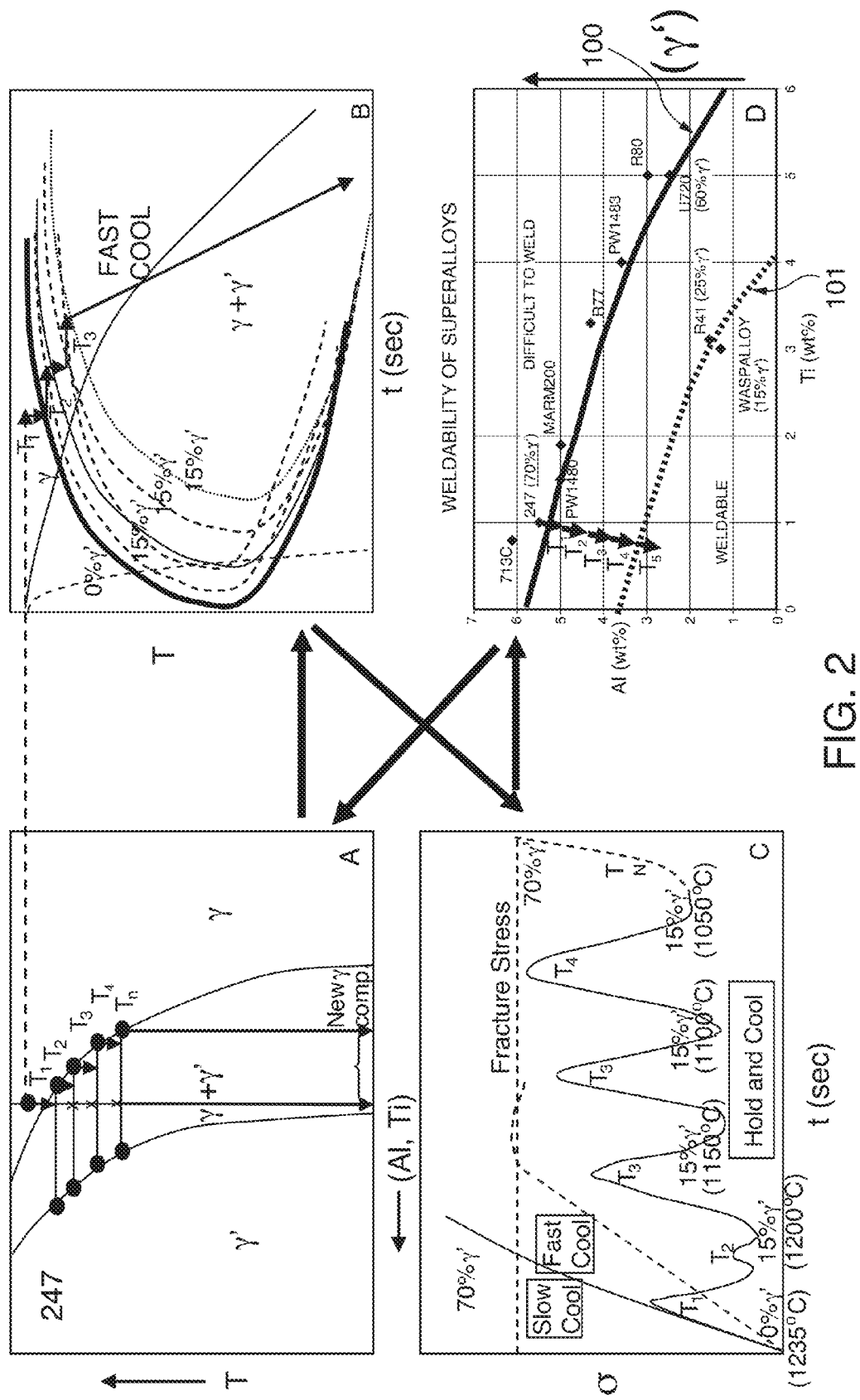
FIG. 2 are graphical depictions of details of hold and cool processes pursuant to some embodiments of the present invention.

FIG. 2 is a schematic depiction of metallurgical reactions for high strength Ni base superalloys which are laser built up with processes described herein. When the laser melting operation is finished the heat source (e.g., the induction coil 260 in FIG. 3, or similar heat source) is operational and the following process is utilized.

a. Hold at $T_1$ for 1-3 minutes.
b. Cool to $T_2$ and hold for 2-15 min: Produce less than 20% γ'
c. Cool to $T_3$ and hold for 2-30 min: Produce less than 20% γ'
d. Cool to $T_4$ and hold for 0.1-2 hrs: Produce less than 20% γ'
..
..
..
..

Cool to $T_n$ and hold for 1-20 hrs (n=1-20): Produce less than 20% γ'

Cool to room temperature to produce final γ' content, which is less than about 20%.

It is anticipated that some embodiments of the present invention can be used for laser build up of high temperature nickel base superalloys typically having more than about 20% γ' in their room temperature structure but, pursuant to some embodiments of the present invention, result in γ' less than about 20% at each hold and cool step. These nonweldable superalloys include each superalloy listed above the nonweldable line 100 in FIG. 1, but improved pursuant to some embodiments of the present invention to lie closer to the weldable zone.

Some embodiments of this invention advantageously employ two heat sources. First heat source is used to melt the preplaced powder, typically a laser beam 240 or other directed energy beam, as depicted schematically in FIG. 3. A second heat source is used for pre-heating deposited powder and for the controlled cool and hold portion of the process. This second heat source is conveniently taken to be an induction coil 260 as depicted in FIGS. 3 and 4 but other heating sources are not excluded. This induction coil 260 or other second heat source adjusts the temperature of the weld build up in order to produce 20% or less γ' from the γ at any hold temperature. Elemental partitioning of Al and Ti into γ and γ' is calculated from the processing conditions employed making use of available thermodynamic data. Conditions are chosen so as to produce a maximum 20% γ' formation at any hold temperature. Hold times to reach 20% γ' are calculated from known phase transformation kinetics of the γ-γ' system such as those available through the JMatPro thermodynamic software available through Sente Software, Inc., Pittsburgh, Pa.

Thus, briefly stated, some embodiments of the present invention relate to the laser build up of Ni base superalloy materials generally considered to be non-weldable as would be useful, for example, in the build up of substantially crack free, near 100% base metal build up on gas turbine components.

The welding process described herein makes use of elemental partitioning of Al and Ti into γ and γ' phases through a step cool and hold process. This depletes the γ phase from Al in a controlled fashion and Ti and improves weldability, typically be achieving a low weight % of γ'. When the Al and Ti content of the stress relieved γ in the joint is reduced to weldable values, the step cool and hold process is terminated and replaced with conventional weld argon cooling.

Typical embodiments of this invention use two heat sources. One heat source (the first) is used for melting/joining as in a conventional welding process. A laser heat source 240 is advantageously used as this first heat source but other heat sources are not inherently excluded such as arcs, discharges, electron beams, particle beams, among others.

The other (second) heat source is used for an initial heating of prepositioned powder and for the hold and cool portion of the process. This second heat source adjusts the isothermal hold temperature of the joint to produce no more than about 20% γ' at any isothermal hold temperature. An induction heat source 260 is advantageously used as this second heat source but other heat sources are not inherently excluded. Of course, when the powder 230 is deposited concurrently with the melting step, as depicted in FIG. 4 for example, preheating temperature is not known precisely. However, even with concurrent deposition of powder, the preplaced powder quickly reaches the temperature of the bare metal of the substrate 201.

One important goal of the concurrent deposition of powder as depicted in FIG. 4 is to prevent the laser beam 242 from interacting directly with the bare metal substrate 201. However, it is important for success of the step, hold and cool process to start at a temperature of about 1200 deg. C. or above. The concurrent deposition process achieves this start temperature by the use of an induction heater 260 as well as the heating of the powder by the adjacent laser-generated melt pool 250.

Elemental partitioning of Al and Ti is calculated from available thermodynamic data that allows a maximum 20% γ' formation at any isothermal hold temperature. Hold times needed to achieve 20% γ' are calculated from the known phase transformation kinetics of the γ-γ' system. Alloys of particular interest here include those noted on FIG. 1.

Cooling of a Ni base γ' superalloy from its melting temperature results in such superalloys going through a transition from γ phase to γ+γ' phases. The hold and cool process described herein employs the elemental partitioning of Al and Ti into γ and γ' phases in full thermodynamic phase equilibrium to produce no more than 20% γ' at any hold time during the hold and cool process. This depletes the γ phase from Al and Ti and moves the final γ composition into the weldable region as depicted in FIG. 1.

In this process as depicted in FIG. 2, γ is depleted from Al and Ti through elemental partitioning until its final composition is reduced below the weldable line 100 in FIG. 2D. Compositional change of γ is shown with spots $T_1$-$T_n$ in FIG. 2A. FIGS. 2B and 2C show the anticipated shift in the cooling curves and the stress vs. time curve after each hold step due to stress relief of the weld at each hold step.

It is expected that the general hold and cool process as described herein can be used on almost any superalloy that experiences strain age cracking. Elemental partitioning of Al and Ti during the hold portions of the process reduces the likelihood of strain age cracking and hot cracking. Such partitioning also significantly reduces the tendency towards strain age cracking during post weld heat treatment since γ is substantially depleted from Al and Ti, and stress relieved, at each step of the hold and cool process.

Although various embodiments which incorporate the teachings of the present invention have been shown and described in detail herein, those skilled in the art can readily devise many other varied embodiments that still incorporate these teachings.

What is claimed is:

1. A method of repair additive build up of a nickel (Ni) base superalloy with significant titanium (Ti) and aluminum (Al) content comprising:
   a) preplacing a Ni base superalloy powder having significant Ti and Al content onto a substrate of the same composition as the Ni base superalloy powder;
   b) preheating the preplaced powder to a temperature above 1200 deg. C. with a first heat source;
   c) melting the preplaced powder with one or more passes of a directed energy beam second heat source so as to produce a heat affected zone having a width less than 100 microns, removing the second heat source when melting is completed;
   d) performing a controlled step and hold cooling of the melted preplaced powder with the first heat source such that no more than 20 weight percent of γ' phase is formed during the step and hold cooling.

2. A method as in claim 1 wherein the thickness of the additive build up is in the range from 1 millimeter to 10 millimeters.

3. A method as in claim 1 wherein the preplaced powder has a particle size in the range from 10 microns to 100 microns.

4. A method as in claim 1 wherein the superalloy of said nickel base superalloy is selected from the group consisting of: 713C, 247, PW1480, MARM200, R77, PW1483, R80, U720, 738 and mixtures thereof.

5. A method as in claim 1 wherein the controlled step and hold cooling from an initial temperature $T_1$ to room temperature consists of a plurality of steps:
   a. Holding at $T_1$ for a time in the range from 1 min to 3 min;
   b. Cooling to a temperature $T_2$ lower than $T_1$ and hold for a time in the range from 2 min to 15 min so as to produce less than 20 weight percent γ' phase;
   c. Cooling to a temperature $T_3$ lower than $T_2$ and hold for a time in the range from 2 min to 30 min so as to produce less than 20 weight percent γ' phase;
   d. Cooling to a temperature $T_4$ lower than $T_3$ and hold for a time in the range from 6 min to 120 min so as to produce less than 20 weight percent γ' phase; and
   e. Cooling to room temperature in a plurality of cooling steps from $T_4$ to room temperature wherein the temperature at each step is maintained from 1 hour to 20 hours, so as to produce less than 20 weight percent γ'.

6. A method of additive build up of a nickel (Ni) base superalloy with significant titanium (Ti) and aluminum (Al) content comprising:
   a) placing a Ni base super alloy powder on a substrate of the same composition;
   b) preheating the preplaced powder to a temperature above 1200 deg. C. with a first heat source;
   c) melting the preplaced powder with one or more passes of a directed energy beam second heat source so as to produce a heat affected zone having a width less than 100 microns, removing the second heat source when melting is completed;
   d) performing a controlled step and hold cooling of the melted preplaced powder with the first heat source such that no more than 20 weight percent of γ' phase is formed during the step and hold cooling.

* * * * *